Figure 3:
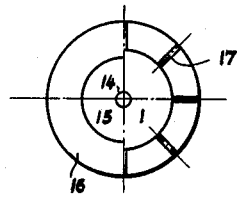

Aug. 18, 1964  H. GEHRE  3,144,768
FLUID METER CONSTRUCTION
Filed July 31, 1957  3 Sheets-Sheet 1

INVENTOR.
HANS GEHRE
BY *Burger, Dinklage & Sprung*
ATTORNEYS

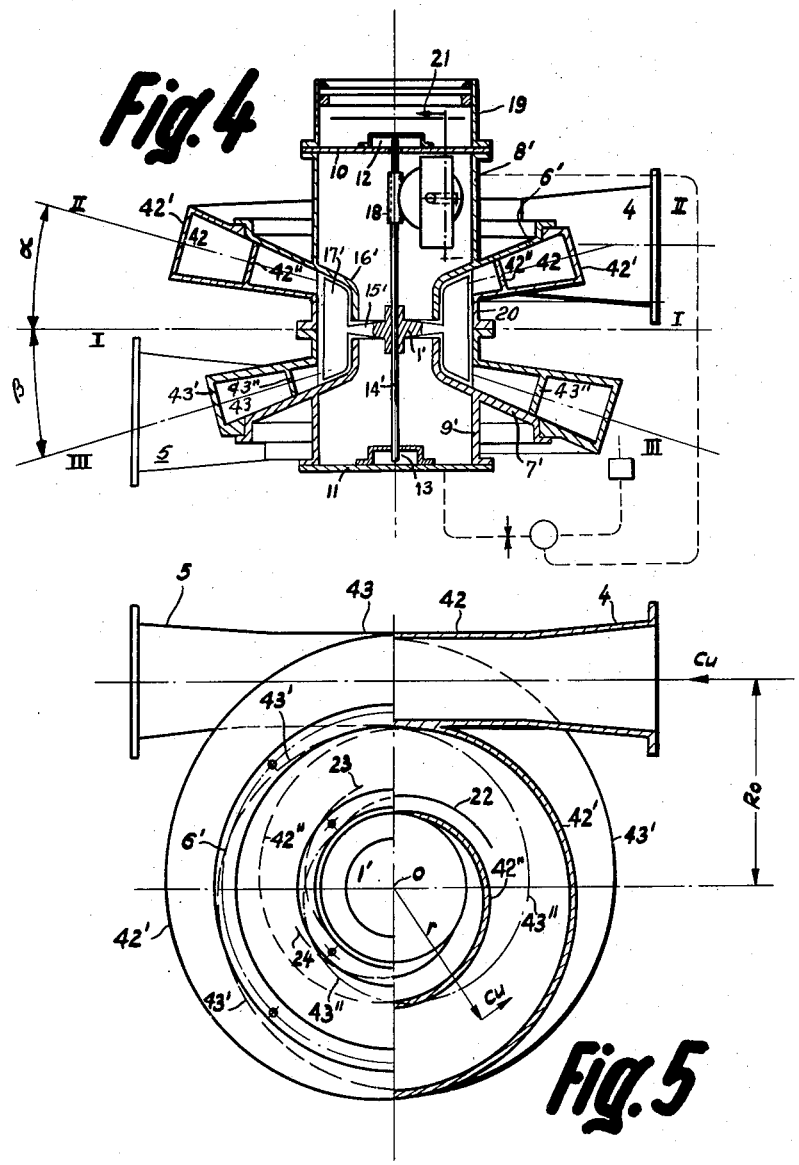

Aug. 18, 1964

H. GEHRE 3,144,768

FLUID METER CONSTRUCTION

Filed July 31, 1957

3 Sheets-Sheet 3

INVENTOR
HANS GEHRE

BY
ATTORNEYS

# United States Patent Office 3,144,768
Patented Aug. 18, 1964

3,144,768
FLUID METER CONSTRUCTION
Hans Gehre, Oberkassel, Germany
Filed July 31, 1957, Ser. No. 675,315
Claims priority, application Germany Aug. 6, 1956
13 Claims. (Cl. 73—231)

This invention relates to an improved fluid meter construction. The invention more particularly relates to an improved construction for a fluid such as a gas meter of the measuring wheel type. Meters for measuring fluids flowing through a pipe line such as gas flow, in which the fluid flow actuates and causes rotation of a turbine or measuring wheel are known. These meters are generally referred to as measuring wheel meters.

In the actuation of measuring wheel meters by the flowing fluid a certain portion of the rotational impulse imparted to the meter by the flowing fluid is used to overcome the resistance to rotation of the measuring wheel as for example, as caused by inertia, frictional resistance, etc. The smaller the portion of the fluid impulse which is used to overcome this resistance to rotation of the measuring wheel, the more precise is the indication of the meter. Accordingly, in measuring light gaseous media, a dependable measurement can only be obtained if the velocity of flow of the medium at the measuring wheel is as large as is possible. However, on the other hand, the pressure consumed at the meter must be kept small for reasons of operation and due to the existing calibration requirements so that it is important to provide a path of flow within the meter which ensures the greatest possible flow pulse at the measuring wheel while at the same time guaranteeing a minimum flow loss. Measuring wheels in meters of this type may be positioned for example in the neck of a Venturi and the path leading to and from the measuring wheel must be so chosen that additional flow resistances as for example, sudden changes in the flow cross section, dead spaces through which the measuring wheel or blades or the flow move, etc., are avoided.

Very often in present day practice the fluid media being measured not only flows forward through the pipe system but often flows in the reverse direction so it is highly desirable that the meter be able to measure forward or backward flow in an equally dependable manner. Under these conditions, the difficulties and influences which are already present and must be overcome in connection with meters which measure in only one direction of flow, in order to obtain error curves which will meet with the approval of the authorities are greatly increased. For these reasons, it was generally not possible in connection with the previously known measuring wheel meters which were used for the measurement of light and particular gaseous fluids to obtain official approval for measurement in both directions of flow, i.e., forwards and backwards.

Figure 1:
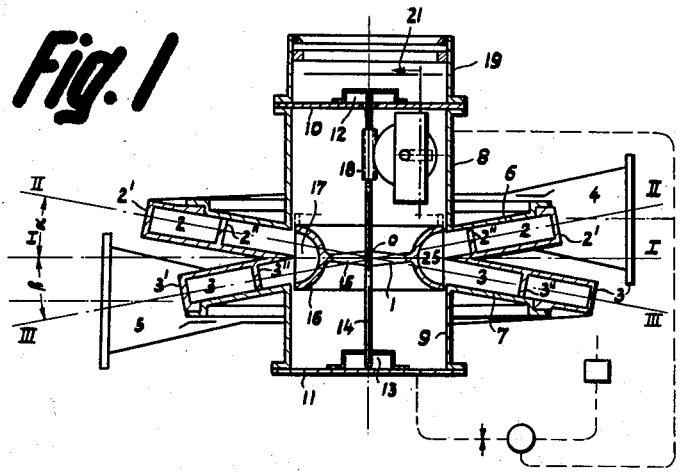
Figure 2:
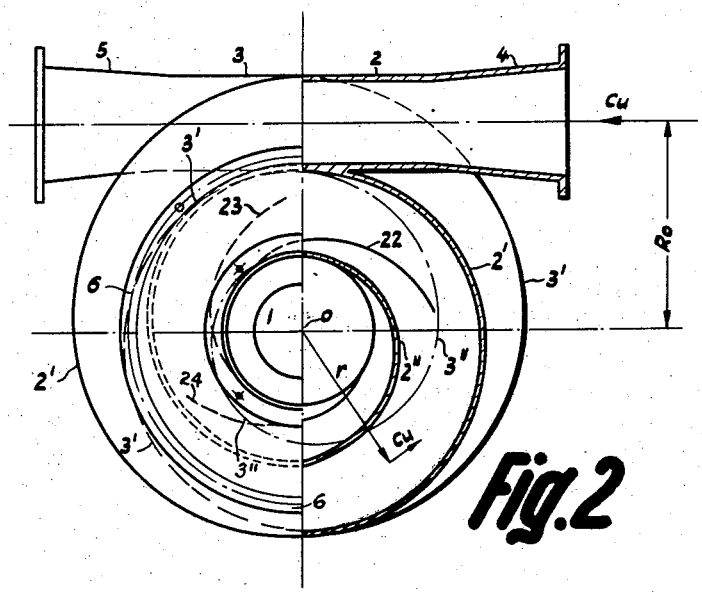
Figure 6:
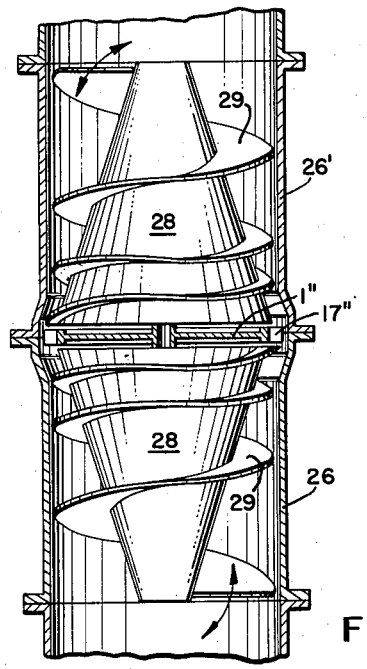
Figure 7:
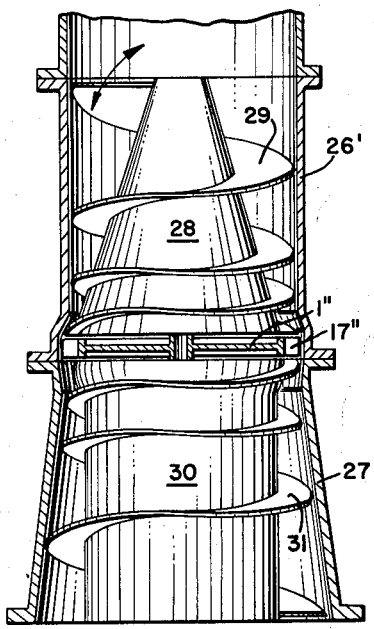
Figure 8:
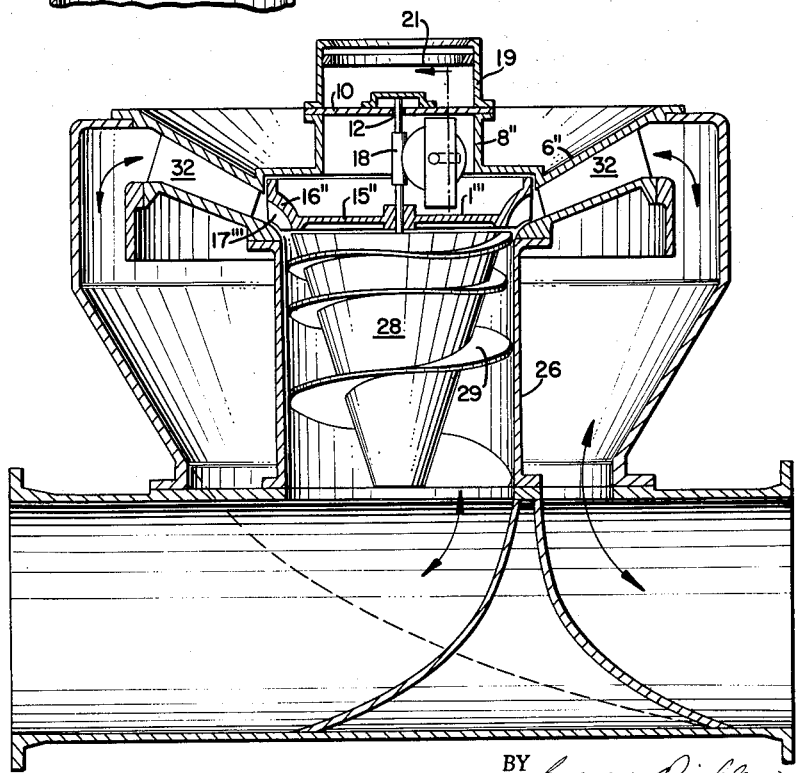

One object of this invention is a novel construction of measuring wheel meter which will allow measurement of both forward and backward flow in an equally dependable manner. This and still further objects will become apparent from the description read in conjunction with the drawings in which:

FIG. 1 is a vertical section of an embodiment of a measuring wheel meter in accordance with the invention, FIG. 2 is a diagrammatic plan view partially in section of the embodiment shown in FIG. 1, FIG. 3 is a diagrammatic plan view showing the measuring wheel for the meter shown in FIG. 1, FIG. 4 is a vertical section of a further embodiment of a meter in accordance with the invention, FIG. 5 is a diagrammatic plan view partially in section of the embodiment shown in FIG. 4, FIG. 6 is a diagrammatic vertical section showing a further embodiment of measuring wheel meter in accordance with the invention, FIG. 7 is a diagrammatic vertical section showing a further embodiment of measuring wheel meter in accordance with the invention, and FIG. 8 is a diagrammatic vertical section showing another embodiment of measuring wheel meter in accordance with the invention.

The measuring wheel meter in accordance with the invention for measuring the flow of fluids has a rotatable measuring wheel of the known and conventional construction with blades adapted to be acted on tangentially by a flowing fluid. In accordance with the invention, means are provided which define a first spiral path of fluid flow of decreasing cross sectional area leading to the measuring wheel of the meter and terminating substantially tangentially at this measuring wheel. Means are provided which define a second spiral path of fluid flow leading tangentially from the measuring wheel in the same direction of spiral as the first spiral path of fluid flow and increasing in cross sectional area in a direction away from the measuring wheel. The first and second spiral paths are in flow communication with each other at the measuring wheel and preferably form a continuation of each other at the measuring wheel. The spiral paths of fluid flow preferably terminate as pipe connections which are used to connect the meter in the pipe line through which the fluid which is to be measured flows.

Due to the increase in the cross sectional area of the spiral paths of fluid flow in the direction away from the measuring wheel irrespective of the direction in which fluid is fed through the meter, the same will pass to the measuring wheel in a spiral accelerated flow and flow away from the measuring wheel in a delayed spiral flow so that on both sides of the measuring wheel there is assured an energy conversion which takes place in accordance with the same loss.

Referring to the drawing, in which all like parts have the same reference designations, it is seen that in the embodiment of the invention shown in FIGURES 1 to 3, 1 is the measuring wheel of a tangential-flow meter, the housing of which consists of two spiral parts 2 and 3, one of which is connected in front of the measuring wheel and the other behind it. The housing part 2 has the pipe line connection 4 and the part 3 the connection 5. The housing part 2 is closed on top by a cover-shaped flange 6 and part 3 by a corresponding flange 7. The flange 6 bears a cylindrical extension 8 and the flange 7 a correspondingly developed extension 9. These extensions are closed off by the plates 10 and 11 on which the supports 12 and 13 of the vertical measuring wheel shaft 14 are arranged. The measuring wheel 1 has a central disc 15 having an annular shell-like ring 16 in which the blades or vanes 17 are vertically arranged preferably radial to the shaft 14 (FIGURE 3). The rotation of shaft 14 is transmitted here in the manner known in connection with measuring wheel meters by means of a worm 18 (FIGURE 1) and the customary gear wheels to an indicating mechanism 21 present below the cap 19 of the meter.

FIGURE 2 shows, on the left, a plan view with the cover 6 and a section through the cylindrical extension 8 and on the right a horizontal section through the spiral housing part 2. The spiral course of the outer wall 2' and of the inner wall 2" can be noted, the continuation thereof being indicated on the left hand side of the figure by dotted lines. FIGURE 1 shows these two walls in vertical section. The fluid flow entering between them from the connection 4 is fed in accelerated motion by the guide blades 22, 23, 24, of any suitable construction (which are also indicated on the left hand side of the figure in dotted lines), and the housing wall 2″ approximately tangentially through the spirally shaped path to the measuring wheel 1 vertical to the blade surfaces 17 and is then conducted while retaining the direction of rotation of the measuring wheel through the housing part 3 spirally in delayed motion, from the measuring wheel 1 outside to the connection pipe 5. In FIGURE 2 the course of the outer channel wall 3′ and of the inner wall 3″ of the spiral housing part 3 are shown.

In the embodiment shown in FIGURES 1 to 3, the acceleration or delay is caused because the distance between the inner and outer walls of the spiral channels decreases as the channels approach the measuring wheel. The kinematic counterpart to this is shown in the embodiment of FIGURES 4 and 5. In this embodiment the corresponding outer and inner walls 42′, 42″ and 43′, 43″ of the spiral channels 42 and 43, respectively are concentric and therefore arranged with a constant distance apart, and it is the height of the flow path which decreases upon coming closer to the shell-shaped ring 16′ of the measuring wheel.

As shown in FIGURE 1, the housing parts 2 and 3 have a frusto conical shape being inclined to the plane of rotation of the meter, the part 2 forming the angle $\alpha$ with the plane of rotation I—I of the measuring wheel 1 and part 3 the angle $\beta$. This development serves, in combination with the annular shell-shaped measuring wheel ring 16, to conduct the fluid to be measured with as little disturbance as possible from one part of the housing to the other. It can easily be seen that this transfer takes place with a minimum amount of disturbance when $\alpha$ approximately equals $\beta$ ($\alpha \approx \beta$) and the lines of symmetry II and III of the two housing parts are parallel or merge at the axial point 0. If the angles $\alpha$ and $\beta$ are of different size, the flow when passing from one part of the housing to the other is deflected within the shell-shaped ring 16 of the measuring wheel and thereby produces an axial thrust which can be used when $\beta > \alpha$ to relieve the lower supporting bearing of the shaft 14. It can be directly seen that for the sectional profile of the path of motion a semi-spherical, elliptical, parabolic with cut vertex cap or any other suitable shape can be used instead of a conical shape. In each such case, ready passage in both directions is possible.

The measuring wheel 1, which is very light, is provided with blade surfaces which are directed preferably at right angles to the flow and which, upon a change of the flow in one or the other direction, act as driving or damping surfaces (brake surfaces). In order to reduce the moment of inertia of the measuring wheel the shell ring on the measuring wheel can be omitted as shown in FIGURE 4 so that the said wheel 1′ on shaft 14′ consists only of the disc 15′ and the blades 17′. The shell ring 16′ is then stationary and divided at the plane I—I with its upper half rigidly connected with or defined by the cover shaped flange 6′ at the cylindrical extension 8′ and its lower half connected with or defined by the cover shaped flange 7′ at the cylindrical extension 9′. Between the two shell halves there remains an annular gap in which the disc 15′ of the measuring wheel 1′ can move unimpededly with a slight clearance and with it the blades 17′ can move in the annular space formed by the divided shell 16′.

Since in the embodiment of FIGS. 1–3, for example, as will be true correspondingly with all of the various embodiments of the invention, the measuring wheel 1 can be kept very light and easily moved and since the flow impinges on its blade surfaces 17 approximately at right angles, it responds even in case of very slight velocities of flow regardless of the direction of rotation at which the blades 17 are struck. Since additionally the housing parts 2 and 3 are so developed that for equally large quantities of flow they feed the fluid to be measured in both directions of flow with the same speed to the measuring wheel, the measuring wheel meter in accordance with the invention indicates with equal accuracy in both directions of flow. The transmission between the measuring wheel 1 and the meter 21 remains the same for both directions of flow because the blade surfaces 17 of the measuring wheel 1 do not deflect the flow but are struck approximately at right angles by it and are carried along by the gyrating flow. This equally accurate indication in both directions of flow can be used to check the accuracy of the meter, by interchanging the input and output after a certain period of operation by turning the meter around or by reversing it within the pipe system in which it is installed. If the same readings are obtained in both directions of flow, the meter is operating properly, otherwise, it should be cleaned.

In the embodiment shown in FIGURES 1 and 3, the lower wall of the housing part 2 and the upper wall of the housing part 3 (cf. at 25 in FIGURE 1) pass directly into one another. However, the two housing parts 2 and 3 can also be removed from one another and a cylindrical piece of pipe coaxial with the shaft 14 of the measuring wheel can be provided as connection between them. This feature is specifically shown in FIGURE 4 by pipe means 20.

In the case of this structural variant, as shown in FIGURE 4, the said two half-shell rings 16′ fastened to the flanges 6′ and 7′ have corresponding cylindrical extensions. This results in an increase in the size of the vane surface 17′. The driving moment on the measuring wheel by the fluid flow increases in the ratio of the increase of the area and as a result of this, the precision of the reading of the meter is increased.

The embodiments described up to this point have a spiral housing. Of course, any other suitable shape can be obtained provided that the path of motion of the flow in the feed line and in the discharge line is developed in the manner in accordance with the invention by correspondingly installing guiding devices or elements. In this connection, it is also immaterial whether each guiding element (blade or the like) is fastened by itself (for instance by notches, grooves, pins or the like) in the housing or whether complete guide apparatus are inserted in suitable manner in the meter housing and the claims are intended to cover all structural variants which can be used to carry out the invention.

A number of further embodiments of the invention are shown in FIGURES 6, 7 and 8 of the drawing. Here the housing parts 26, 26′ of FIGURE 6, 27 and 26′ of FIGURE 7, and 26 and 32 of FIGURE 8 correspond to parts 2 and 3 of FIGURE 1 and 42 and 43 of FIGURE 4. In parts 26 and 26′ there is provided coaxially a conical guide member 28 on which there are fastened guide plates 29 which have the shape of helical surfaces and support the guide member 28 against the outer wall. The fluid flow coming from below in housing 26 for instance as shown in FIGURE 6 and FIGURE 8 is forced by the increasing constriction of the spiral flow path to become constantly faster and reaches its maximum upon tangential entrance into the measuring wheel 1.

In FIGURE 7, the fluid flow coming from below is forced by the increasing constriction of the spiral flow path to become constantly faster in the same way. The spiral path in this case, has a cross sectional area which decreases in the direction of the measuring wheel caused by a conically widened housing part 27 and a cylindrical core 30. This core is supported by the guide blades 31 which have the same direction of turn as the guide blades 29 and are so arranged that they also increase the velocity of flow as it approaches the wheel.

The fluid flow then exits through the housing part 26′ as in FIGURES 6 and 7 conversely becoming constantly slower in velocity as the spiral flow path increases in cross-section with increased distance from the wheel 1″, or through housing part 32 as shown in the embodiment of FIG. 8. In the case of the housing part 32, having a corresponding flange 6″ and cylindrical extension 8″, the spiral flow path also increases in cross-section with increased distance from the wheel $1'''$.

It will be noted that in the embodiments of FIGS. 6 and 7, the wheel $1''$ is located in the gap between guide members 28, 23, and 28, 30, respectively, the annular shell-like ring 16 being omitted, while in FIG. 8 the wheel $1'''$ is provided on the central disc $15''$ with only a half-shell $16''$ and its blades $17'''$ are adapted to the guiding of the flow.

The drawing in all of the embodiments presented clearly shows in housings 2 and 3, 42 and 43, 26 and $26'$, 27 and $26'$ or 26 and 32, the combination in accordance with the invention of the basic form (known per se) with the spiral flow paths, the opposition of the spiral path towards the inside and the outside in the two housing parts, the passing into one another of the two spiral paths at the measuring wheel and the reduction of the flow cross section of these spiral paths upon approaching the periphery of the measuring wheel.

In principle, the theorem of conservation of areas applies to a spiral flow as long as no energy is removed from it. This theorem states that the product of the peripheral component $c_u$ of the flow velocity at any place in the spiral flow and the distance $r$ between this place and the center of rotation 0 (cf. FIGURE 2) is constant. We thus have $r.c_u$=constant, from which it follows that the velocity of rotation $c_u$ is greatest where $r$ is smallest, namely at the blade ring of the measuring wheel 1. If the perpendicular distances $R_0$ of the center lines of the connections 4–5 from the center of rotation 0 are equal to each other, then, as can easily be seen, the velocities of flow and discharge $c_4$ and $c_5$ are equal to each other in the connections since $c_4=c_{u4}$ and $c_5=c_{u5}$. From the theorem of the conservation of areas $$(R_0.c_{u4}=r.c_u=R_0.c_{u5})$$

the spiral course of the guide means and the continuity equation ($F.c$=constant), there is obtained the flow cross section associated with each $r$. According to the continuity equation, F is the flow cross-section and $c$ is the velocity, so that for a spiral flow in a fixed volume stream, the velocity is inversely proportional to the flow cross-section.

The velocity component $c_m$ directed radially towards or away from the center of rotation 0 is in both cases $$c_m = \frac{Q}{2.r\pi.b}$$

in which Q is the volume of flow per second and $b$ the distance apart of the side walls of the spiral housing along the circle $2.r\pi$. In the case of parallel side walls, as shown for instance in FIGURES 4 and 5, for $Q$=constant and $b$=constant, we also have $c_m.r$=constant. Since $r.c_u$ is constant, $$\frac{c_m.r}{c_u.r} = \text{constant}$$

Furthermore $$\frac{c_m}{c_u} = \text{constant} = \tan \epsilon = \frac{d.r}{r.d.\phi}$$

since the direction of the velocity and the direction of the flow line or guide blade agree.

In such case, $r$ and $\phi$ are the polar coordinates referred to the center point 0 of rotation. The guide blades therefore since tan $\epsilon$=constant, extend here in accordance with logarithmic spirals. Naturally, the shape of the guide blades can just as well be some other shape. It depends on the variation of the cross section along the spiral path of motion.

If a gaseous medium to be measured flows for instance under the absolute pressure $p_1$ into the meter and discharges from it under the pressure $p_3$ then in accordance with Bernoulli's equation since $c_4=c_5'$ (see above) the output pressure $p_3$ is theoretically equal to the input pressure $p_1$ and this equality is actually also achieved with a high degree of approximation. Furthermore, from the velocity of flow at the inlet to the measuring wheel 1, the pressure $p_2$ prevailing there can be determined. The pressure retransformation from $p_2$ to $p_3$ takes place in a manner similar to that occurring in the well known Venturi tube, but with the essential and advantageous difference that the recovery of the pressure is not affected solely by the widening of the cross section, but is also promoted in natural manner (theorem of the conservation of areas) by the rotational motion of the medium to be measured.

As a result of the above described spiral shape of the feed and discharge path, the development of the measuring wheel 1 described and the constantly approximate perpendicular admission onto the measuring wheel blades, there are eliminated those disturbances which are unavoidable when an impeller wheel is inserted in the narrowest cross section of a Venturi tube and not only endanger the pressure recovery of such a Venturi tube which in itself is good, but also, in view of the complicated flow processes at the measuring wheel do not permit a forward and backward measurement which meets the requirements of possibility of calibration.

In the embodiments of the invention according to FIGURES 1 to 3 and 4 and 5, a Venturi tube having a straight axis is so to say replaced by one having a spirally curved axis (housing parts 2 and 3 or 42 and 43, and shell 16 or halved shells $16'$). In the other examples, this concept has been analogously realized.

If measuring wheel meters are to serve for forward measurement and for rearward measurement, it is not sufficient that they indicate directly down to about 10% of the nominal load as in the case of only *one* direction of flow. Rather, specifically upon the transfer from one direction of measurement to the other, they must still correctly indicate flow intensities which are below the said measurement range. In the case of the measuring wheel meter according to the invention, this measurement range has been extended so far downward and the unavoidable losses which occur upon the reversal of the measuring process are so slight that the percentage error with regard to the total indication of the meter is negligibly small.

I claim:

1. In a measuring wheel meter for measuring the flow of fluids having a rotatable measuring wheel with blades adapted to be acted on tangentially by a flowing fluid, the improvement which comprises means defining a first imperforate spiral path of fluid flow of continuously decreasing cross sectional area leading to said measuring wheel and terminating substantially tangentially at said measuring wheel, means defining a second imperforate spiral path of fluid flow leading tangentially from said measuring wheel in the same direction of spiral of said first spiral path and continuously increasing in cross sectional area in a direction away from said measuring wheel, said first and second spiral path means being in direct unconstrained transitional flow communication with each other at said measuring wheel and together defining an unobstructed spiral vortex path of flow continuing from said first path to said measuring wheel and from said measuring wheel to said second path, the narrowest flow cross-section within said meter being defined by the transitional flow path means at the measuring wheel interconnecting the two spiral flow paths, said transitional flow path means being the sole path of fluid flow communication between the first and second imperforate spiral flow paths and said measuring wheel being disposed within said transitional flow path means in open communication with said spiral flow paths around the entire periphery of said wheel.

2. Improvement according to claim 1, in which said first and second spiral paths form a continuation of each other at said measuring wheel.

3. Improvement according to claim 1, in which said spiral paths of flow terminate as pipe connections.

4. Improvement according to claim 1, in which said spiral paths of flow are at least partially defined by a meter housing.

5. Improvement according to claim 1 including a cylindrical housing member surrounding said measuring wheel in connecting said first and second spiral paths of fluid flow.

6. Improvement according to claim 1, in which at least one of said first and second spiral paths of fluid flow is defined by a conduit extending substantially axially with respect to the axis of rotation of said measuring wheel and having helix guide means positioned therein.

7. Improvement according to claim 6, in which said helix guide means are positioned about a central member concentrically positioned within said conduit to form an annular space between said central member and said conduit, at least one of said conduit and central member having a conical shape so that said annular space decreases in cross sectional area in the direction toward said measuring wheel.

8. Improvement according to claim 7, in which said conduit is substantially cylindrical and in which said central member has a frusto conical shape widening in the direction of said measuring wheel.

9. Improvement according to claim 8, in which said central member is substantially cylindrical and in which said conduit has a frusto conical shape narrowing in the direction of said measuring wheel.

10. Improvement according to claim 1, in which the blades of said measuring wheel are positioned in an annular shell having an outwardly facing annular opening and defining a path of flow communication between said first and second spiral paths.

11. Improvement according to claim 1, in which said means defining said first and second spiral path of fluid flow each terminate at said measuring wheel as an annular concave shaped guide member, said concave shaped guide members collectively defining an annular shell in which the blades of said measuring wheel move and having an outwardly facing annular opening.

12. In a measuring wheel meter for measuring the flow of fluids having a rotatable measuring wheel with blades adapted to be acted on tangentially by a flowing fluid, the improvement which comprises means defining a first spiral path of fluid flow of continuously decreasing cross-sectional area leading to said measuring wheel and terminating substantially tangentially at said measuring wheel, means defining a second spiral path of fluid flow leading tangentially from said measuring wheel in the same direction of spiral of said first spiral path and continuously increasing in cross-sectional area in a direction away from said measuring wheel, said first and second spiral path means being in direct flow communication with each other at said measuring wheel, said spiral paths of flow being defined by frusto conically shaped housings, the housing forming said first spiral path of flow being axially adjacent and in opposed facing relation with respect to the housing defining said second spiral path of flow with the cross sectional areas of the paths defined by said housings decreasing in the direction of each other and toward said measuring wheel.

13. Improvement according to claim 12, in which the walls of said housing defining said first and second spiral paths of fluid flow which have said frusto conical shape have substantially the same angle of inclination with respect to plane of rotation of said measuring wheel to define flow paths having the same radial axis of symmetry.

References Cited in the file of this patent

UNITED STATES PATENTS

| | | |
|---|---|---|
| 50,307 | Walcott | Oct. 3, 1865 |
| 132,829 | Harris | Nov. 5, 1872 |
| 138,657 | Johnson | May 6, 1873 |
| 918,097 | Speed et al. | Apr. 13, 1909 |
| 2,299,406 | Potter | Oct. 20, 1942 |
| 2,623,389 | Van Oosterom | Dec. 30, 1952 |

FOREIGN PATENTS

| | | |
|---|---|---|
| 169,016 | Great Britain | Sept. 19, 1921 |
| 295,564 | Great Britain | Aug. 16, 1928 |
| 500,801 | Germany | June 25, 1930 |
| 44,106 | France | July 30, 1934 |
| 628,466 | Germany | Apr. 6, 1936 |